US008188503B2

(12) United States Patent
Lynch et al.

(10) Patent No.: US 8,188,503 B2
(45) Date of Patent: May 29, 2012

(54) CUTTABLE ILLUMINATED PANEL

(75) Inventors: Manuel Lynch, Tustin, CA (US);
Leonard Fraitag, San Diego, CA (US)

(73) Assignee: Permlight Products, Inc., Tustin, CA (US)

( * ) Notice: Subject to any disclaimer, the term of this patent is extended or adjusted under 35 U.S.C. 154(b) by 1095 days.

(21) Appl. No.: 11/014,651

(22) Filed: Dec. 16, 2004

(65) Prior Publication Data
US 2005/0251698 A1 Nov. 10, 2005

Related U.S. Application Data

(60) Provisional application No. 60/569,814, filed on May 10, 2004.

(51) Int. Cl.
*H01L 29/72* (2006.01)
(52) U.S. Cl. ........... 257/99; 40/550; 40/551; 40/564; 40/576; 362/184; 362/555
(58) Field of Classification Search .......... 257/99; 40/550, 551, 564, 576; 362/184, 555
See application file for complete search history.

(56) References Cited

U.S. PATENT DOCUMENTS

| 4,173,035 | A | | 10/1979 | Hoyt |
| 4,854,062 | A | * | 8/1989 | Bayo ........................ 40/551 |
| 4,907,361 | A | | 3/1990 | Villard |
| 5,020,253 | A | * | 6/1991 | Lie et al. .................... 40/576 |
| 5,107,408 | A | | 4/1992 | Vernondier |
| 5,278,432 | A | | 1/1994 | Ignatius |
| 5,296,310 | A | | 3/1994 | Kibler et al. |
| 5,321,593 | A | | 6/1994 | Moates |
| 5,490,788 | A | | 2/1996 | Mazzochette |
| 5,581,876 | A | | 12/1996 | Prabhu et al. |
| 5,660,461 | A | | 8/1997 | Ignatius et al. |
| 5,772,208 | A | * | 6/1998 | McTaggart ................. 273/237 |
| 5,857,767 | A | | 1/1999 | Hochstein |
| 5,927,845 | A | | 7/1999 | Gustafson |
| 6,042,248 | A | | 3/2000 | Hannah et al. |
| 6,045,240 | A | | 4/2000 | Hochstein |
| 6,131,651 | A | | 10/2000 | Richey, III |

(Continued)

FOREIGN PATENT DOCUMENTS
EP 0 632 511 1/1995
(Continued)

OTHER PUBLICATIONS

Petroski, James, "Thermal Challenges Facing New Generation LEDs for Lighting Applications," in Solid State Lighting II, Proceedings of SPIE vol. 4776 (2002).

(Continued)

*Primary Examiner* — Edward Wojciechowicz
(74) *Attorney, Agent, or Firm* — Knobbe, Martens, Olson & Bear, LLP

(57) ABSTRACT

An illumination apparatus is provided having a panel including a plurality of circuit units on a dielectric surface. The circuit units include electrically conductive traces and at least one light emitting diode (LED). At least some of the circuit units have contacts for supplying power to the LED. The circuit units are preferably electrically interconnected so that power provided to one circuit unit also supplied power to at least a group of the circuit units. The apparatus with the circuit units may be cut or shaped to a predetermined or desired shape. Also provided are methods of manufacturing, assembling, and using the illumination apparatus.

13 Claims, 10 Drawing Sheets

U.S. PATENT DOCUMENTS

| | | |
|---|---|---|
| 6,249,267 B1 | 6/2001 | Ishihara |
| 6,250,774 B1 | 6/2001 | Begemann et al. |
| 6,299,337 B1 | 10/2001 | Bachl et al. |
| 6,367,949 B1 | 4/2002 | Pederson |
| 6,371,637 B1 | 4/2002 | Atchinson et al. |
| 6,428,189 B1 | 8/2002 | Hochstein |
| 6,517,218 B2 | 2/2003 | Hochstein |
| 6,528,954 B1 | 3/2003 | Lys et al. |
| 6,573,536 B1 | 6/2003 | Dry |
| 6,578,986 B2 | 6/2003 | Swaris et al. |
| 6,582,100 B1 | 6/2003 | Hochstein et al. |
| 6,712,486 B1 | 3/2004 | Popovich et al. |
| 6,815,724 B2 | 11/2004 | Dry |
| 6,846,093 B2 | 1/2005 | Swaris et al. |
| 6,930,332 B2 | 8/2005 | Hashimoto et al. |
| 7,081,645 B2 | 7/2006 | Chen et al. |
| 7,102,172 B2 | 9/2006 | Lynch et al. |
| 7,108,396 B2 | 9/2006 | Swaris et al. |
| 7,114,831 B2 | 10/2006 | Popovich et al. |
| 7,176,502 B2 | 2/2007 | Mazzochette |
| 7,183,640 B2 | 2/2007 | Mazzochette |
| 7,213,940 B1 | 5/2007 | Van De Ven et al. |
| 7,252,408 B2 | 8/2007 | Mazzochette |
| 7,306,353 B2 | 12/2007 | Popovich |
| 7,315,049 B2 | 1/2008 | Raos et al. |
| 7,329,024 B2 | 2/2008 | Lynch et al. |
| 7,387,406 B2 | 6/2008 | Swaris et al. |
| 7,497,596 B2 | 3/2009 | Ge |
| 2003/0112627 A1 | 6/2003 | Deese |
| 2003/0174517 A1 | 9/2003 | Kiraly et al. |
| 2003/0189830 A1 | 10/2003 | Sugimoto |
| 2003/0218417 A1 | 11/2003 | Chin |
| 2003/0223235 A1 | 12/2003 | Mohacsi et al. |
| 2003/0230934 A1 | 12/2003 | Cordelli et al. |
| 2004/0066142 A1 | 4/2004 | Stimac et al. |
| 2004/0150954 A1 | 8/2004 | Belady et al. |
| 2004/0188593 A1 | 9/2004 | Mullins et al. |
| 2004/0233671 A1 | 11/2004 | Staufert |
| 2006/0006405 A1 | 1/2006 | Mazzochette |
| 2006/0098440 A1 | 5/2006 | Allen |
| 2006/0221609 A1 | 10/2006 | Ryan, Jr. |
| 2007/0007558 A1 | 1/2007 | Mazzochette |
| 2007/0018311 A1 | 1/2007 | Chang |
| 2007/0041220 A1 | 2/2007 | Lynch |
| 2008/0055915 A1 | 3/2008 | Lynch et al. |
| 2008/0079349 A1 * | 4/2008 | Miyazaki et al. ............ 313/495 |
| 2008/0192462 A1 | 8/2008 | Steedly |
| 2009/0086488 A1 | 4/2009 | Lynch et al. |

FOREIGN PATENT DOCUMENTS

| | | |
|---|---|---|
| EP | 0921568 A2 | 6/1999 |
| WO | WO 97/37385 | 10/1997 |

OTHER PUBLICATIONS

Osram Opto Semiconductors, GmbH, Markus Hofman, "Comparison of LED Circuits", Application Note, May 3, 2004.

Hewlett Packard, Super Flux LED's. pp. 1-25, 1-26, and ii.

Thermagon Catalog.

Thermal Solutions for Long-Term Reliability of Power LEDs, *Thermal Management for LED Applications Solutions Guide*, The Bergquist Company, Chanhassen, Minnesota, 6 pages.

Samuelson, Rick, et al., Power Systems Design Europe, *Thermal Management Made Simple*, Dec. 2005, The Bergquist Company, Chanhassen, Minnesota, 6 pages.

* cited by examiner

CUTTABLE ILLUMINATED PANEL

RELATED APPLICATION

This application claims priority from U.S. Provisional Application No. 60/569,814, filed May 10, 2004, entitled "CUTTABLE ILLUMINATED PANEL," the entirety of which is incorporated herein by reference.

BACKGROUND OF THE INVENTION

1. Field of the Invention

This application is in the field of illumination devices and more particularly in the field of illumination devices employing light emitting diodes (LEDs).

2. Description of the Related Art

Most lighting applications utilize incandescent or gas-filled bulbs, particularly lighting applications that require more than a low level of illumination. Such bulbs typically do not have long operating lifetimes and thus require frequent replacement. Gas-filled tubes, such as fluorescent or neon tubes, may have longer lifetimes, but operate using dangerously high voltages and are relatively expensive. Further, both bulbs and gas-filled tubes consume substantial amounts of power.

In contrast, light emitting diodes (LEDs) are relatively inexpensive, operate at low voltage, and have long operating lifetimes. Additionally, LEDs consume relatively little power and are compact. These attributes make LEDs particularly desirable and well suited for many applications. In some applications, LEDs are used as part of lighting apparatus, one of which is in channel lighting.

In channel lighting applications, a back wall of the channel lighting apparatus typically is manufactured separately from the illuminating portion of the apparatus. Assembly of the lighting apparatus can be tedious and labor-intensive, as the illuminating portion must be connected to the channel lighting panels. This is especially true when the lighting apparatus uses fluorescent or neon tubes that must be custom-shaped to fit a desired channel configuration.

SUMMARY OF THE INVENTION

Accordingly, there is a need to provide an LED-illuminated apparatus while minimizing the assembly effort that accompanies existing illuminated apparatus. Disclosed herein is an illuminated LED panel in which the manufacture of the panel and the assembly of the LEDs and associated circuitry are generally combined. Combining the steps of manufacture of the panel and assembly of the LED circuitry can be advantageous for many reasons. For example, combining the steps can reduce the amount of physical labor required to assemble the illumination apparatus following manufacture. Also disclosed herein is an illuminated LED panel that can be formed to a desired shape, and will remain illuminatable.

In one embodiment, a circuitry pattern is applied to a panel that comprises a substrate for the pattern. Electrical components are provided in the circuitry pattern, and the circuitry pattern may be electrically interconnected so that it requires only one power connection to power all the electrical components. The panel may be manufactured of a material that may be cut or shaped following application of the circuitry pattern. Following the shaping of the panel, the panel may be tested to determine whether it needs discrete power connections in different areas.

In another embodiment, an illumination apparatus is provided. The illumination apparatus may comprise a substrate having a dielectric surface and a plurality of circuit units on the dielectric surface. The circuit units may be comprised of electrically conductive traces and at least one LED. At least some of the circuit units may have contacts for supplying power to the LED. At least one power connector may be configured to receive power from a power supply, and the power connector may have power connector contacts adapted to mate with the circuit unit contacts of one of the circuit units. Additionally, each of the circuit units may be electrically interconnected with other circuit units such that one of the power connectors supplies power to at least a group of the plurality of circuit units.

Methods of manufacturing an illumination apparatus are also provided. According to one method provided, the method may comprise providing a substrate with a dielectric surface and providing a plurality of circuit units on the dielectric surface. Each of the circuit units may comprise electrically conductive traces and at least one LED, and at least some of the circuit units may comprise contacts for supplying power to the LED. The method may also comprise providing at least one power connector that is configured to receive power from a power supply. The power connector may comprise power connector contacts that are adapted to mate with the circuit unit contacts of one of the circuit units. The power connector may be connected to a circuit unit so that the power connector contacts mate with the circuit unit contacts.

A method is also provided for making an illuminated channel letter. The method may comprise providing a back comprising a substrate with a dielectric surface and with at least one circuit unit. The circuit unit preferably is configured to provide electrical power to at least one LED. The method further comprises forming the back to a desired shape, providing sides corresponding to the back shape, and providing electrical power to the circuit unit.

For purposes of summarizing the invention, certain embodiments, advantages, and features have been described herein. Of course, it is to be understood that not necessarily all such embodiments, advantages, or features are required in any particular embodiment. Additionally, it is to be understood that the above summary is not intended to limit in any way the embodiments, advantages, or features described below in the Detailed Description of the Preferred Embodiments or the claims.

DETAILED DESCRIPTION OF THE PREFERRED EMBODIMENT

Figure 1:
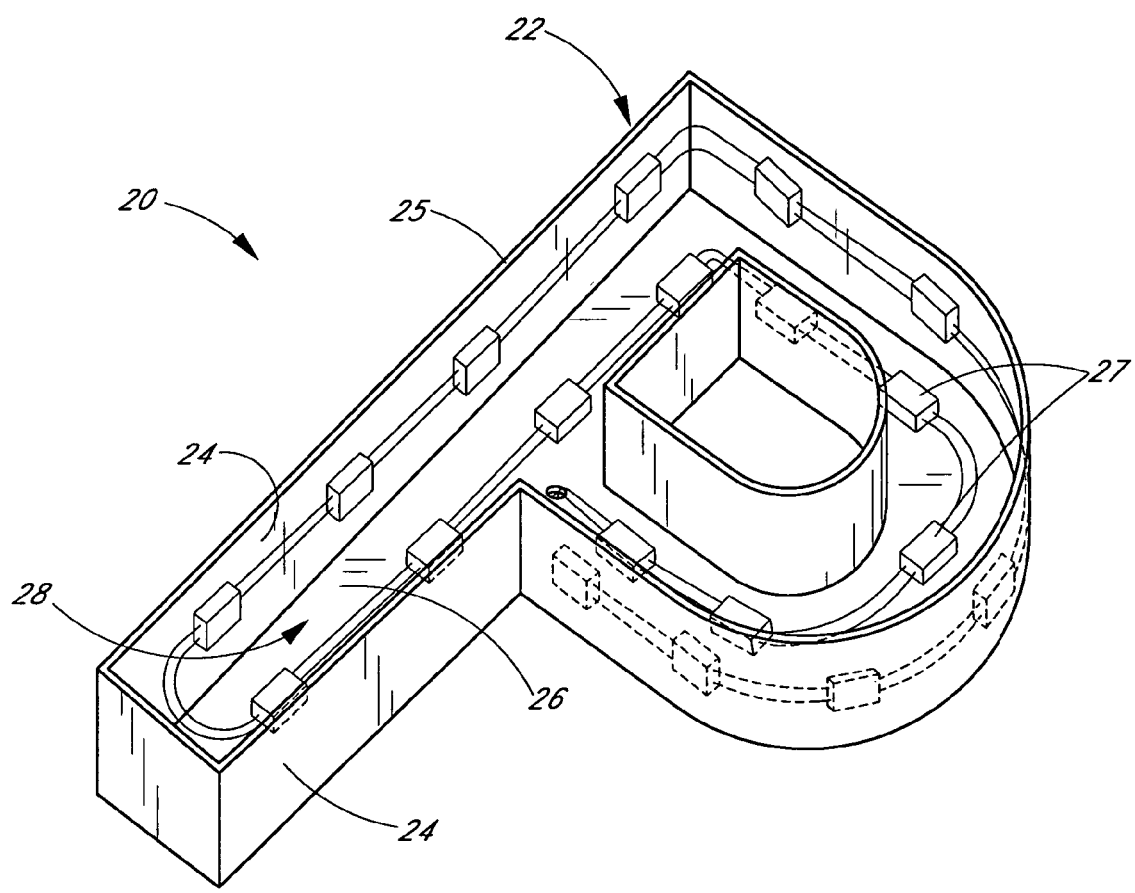
FIG. 1 is a perspective view of an embodiment of a channel lighting apparatus.

With reference first to FIG. 1, a channel illumination apparatus 20 is illustrated comprising a casing 22 in the shape of a "P." The casing 22 includes a plurality of side walls 24 and a back 26, which together define at least one channel 28. The surfaces of the walls 24 and back 26 are diffusely-reflective, preferably being coated with a flat white coating. The walls 24 and back 26 are preferably formed of a durable sturdy metal material. In the illustrated embodiment, a plurality of LED lighting modules 27 are mounted to the walls 24 and back 26 of the casing 22 in a spaced-apart manner. A translucent light-diffusing cover (not shown) is preferably disposed on a front edge 25 of the walls 24 and encloses the channel 28.

Embodiments of channel illumination apparatuses and LED lighting modules for use therein are described in Applicant's U.S. Pat. No. 6,712,486, issued Mar. 30, 2004, entitled "Mounting Arrangement for Light Emitting Diodes," and U.S. Pat. No. 6,578,986, issued Jun. 17, 2003, entitled "Modular Mounting Arrangement and Method for Light Emitting Diodes," both of which are incorporated herein by reference in their entireties and made a part of this specification.

As shown in FIG. 1, lamps such as the illustrated LED modules 27 may be mounted on the sides 24 and/or back 26 of channel illumination apparatus 20. In other types of lighting apparatus, especially apparatus that are used for signage, lamps such as LED modules are mounted to a panel, such as the back panel of the channel, which has been cut to a desired shape in order to create a shaped lighting effect.

Figure 2:
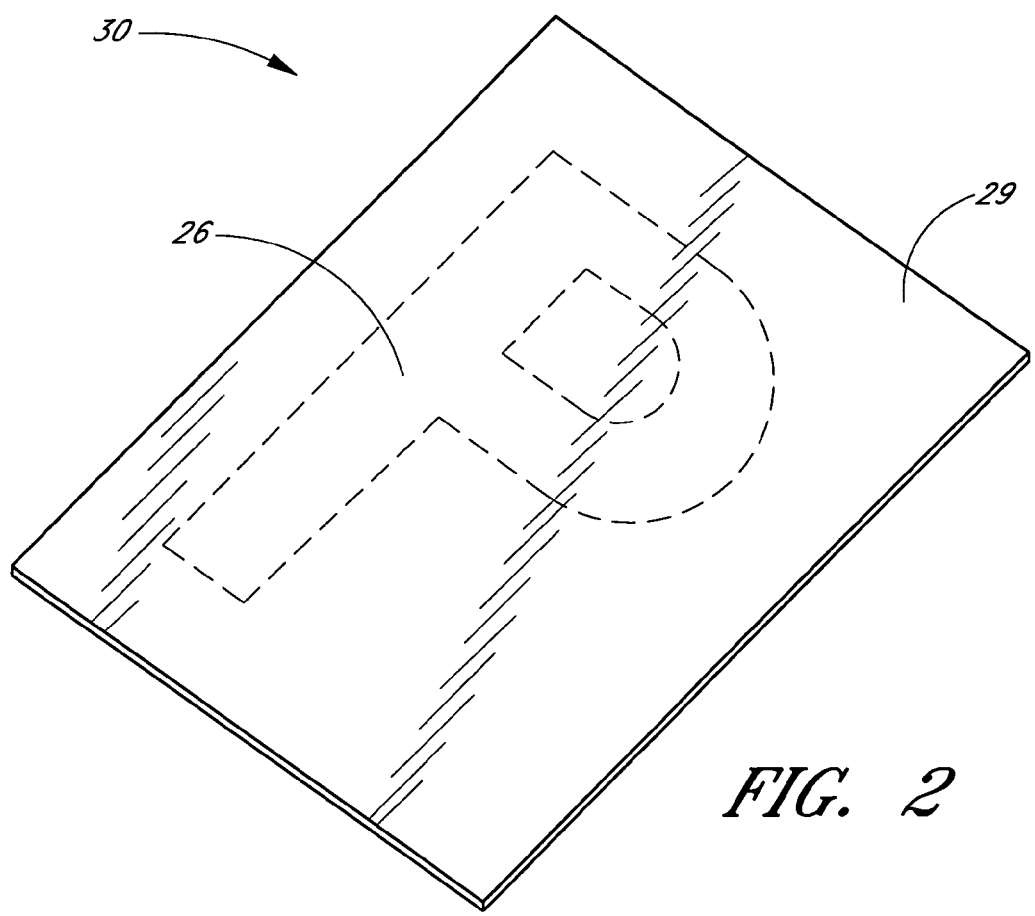
FIG. 2 is a perspective view of a panel showing an outline of a desired shape in dashed lines.
Figure 3:
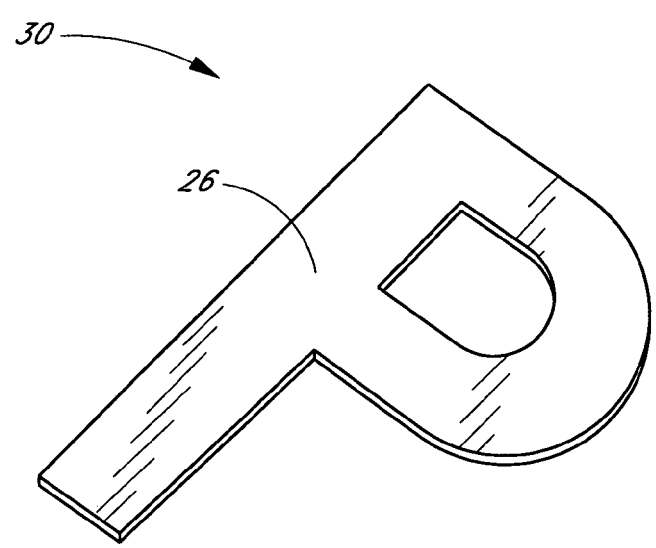
FIG. 3 is a perspective view of the panel of FIG. 2 after having been cut to the desired shape.

FIGS. 2 and 3 illustrate that a desired shape, such as the letter "P," may be cut from a panel 30 of material. As used herein, the term "panel" is a broad term and is used in its ordinary sense and includes, without limitation, a substrate upon which components such as LEDs may be mounted. In some embodiments, panels are generally flat, thin sheets. It is to be understood, however, that a panel may have any desired shape, size, or contour, including variations in thickness and material, and a panel may be cast, molded, cut, worked, or the like into a desired shape and/or configuration.

In one embodiment, a panel comprises a sheet of aluminum or other material. In some embodiments, the panel comprises a laminate material, such as DIBOND™, which is available from Alcan. In some embodiments, a laminate material comprises a plastic layer sandwiched between sheets of aluminum. In one embodiment, the panel is a substrate that comprises a multi-layer panel in which a layer of polyethylene is sandwiched by two layers of aluminum. Panels of this type are available in flat sheets sized four feet by eight feet, although the sheets may be manufactured in various sizes and shapes. In one embodiment, the cut or otherwise formed panel illustrated in FIG. 3 is used as the back 26 of the channel letter of FIG. 1.

Figure 4A:
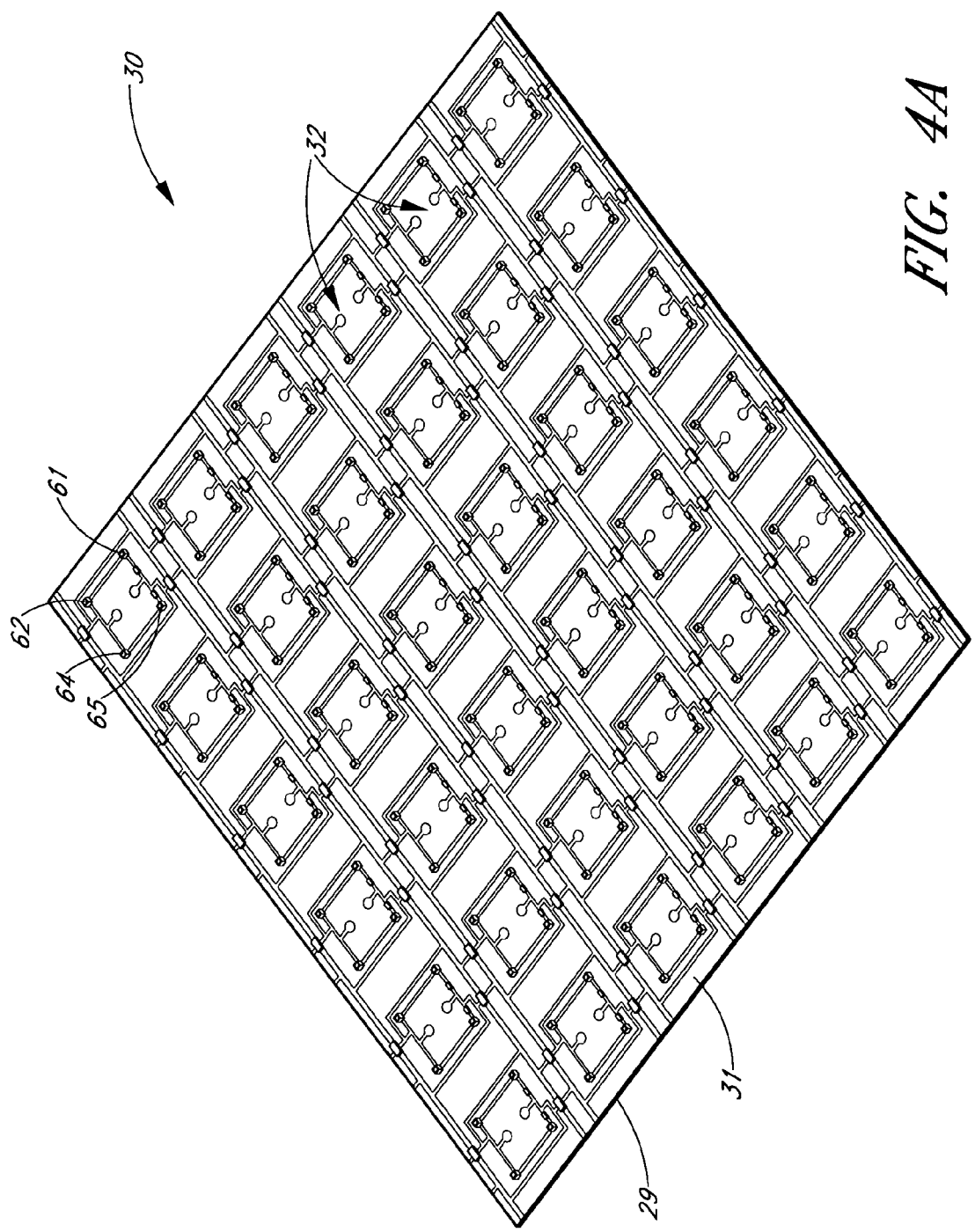
FIG. 4A is a perspective view of an embodiment of a panel comprising a plurality of interconnected circuit units.

With reference to FIG. 4A and in accordance with one embodiment, an illuminated panel 30 is provided having light emitting diodes (LEDs) and associated circuitry. In the illustrated embodiment, a sheet 29 of aluminum, or a laminate having a layer of aluminum, has a dielectric layer 31, such as one or more coats of a diffusely-reflective, nonconductive paint, formed thereon. The sheet 29 preferably operates as a substrate upon which circuitry may be placed. The dielectric preferably insulates the circuitry from metallic materials of the substrate. The paint is preferably diffusely-reflective to distribute light emitted from LEDs placed on the panel 30.

Figure 4B:
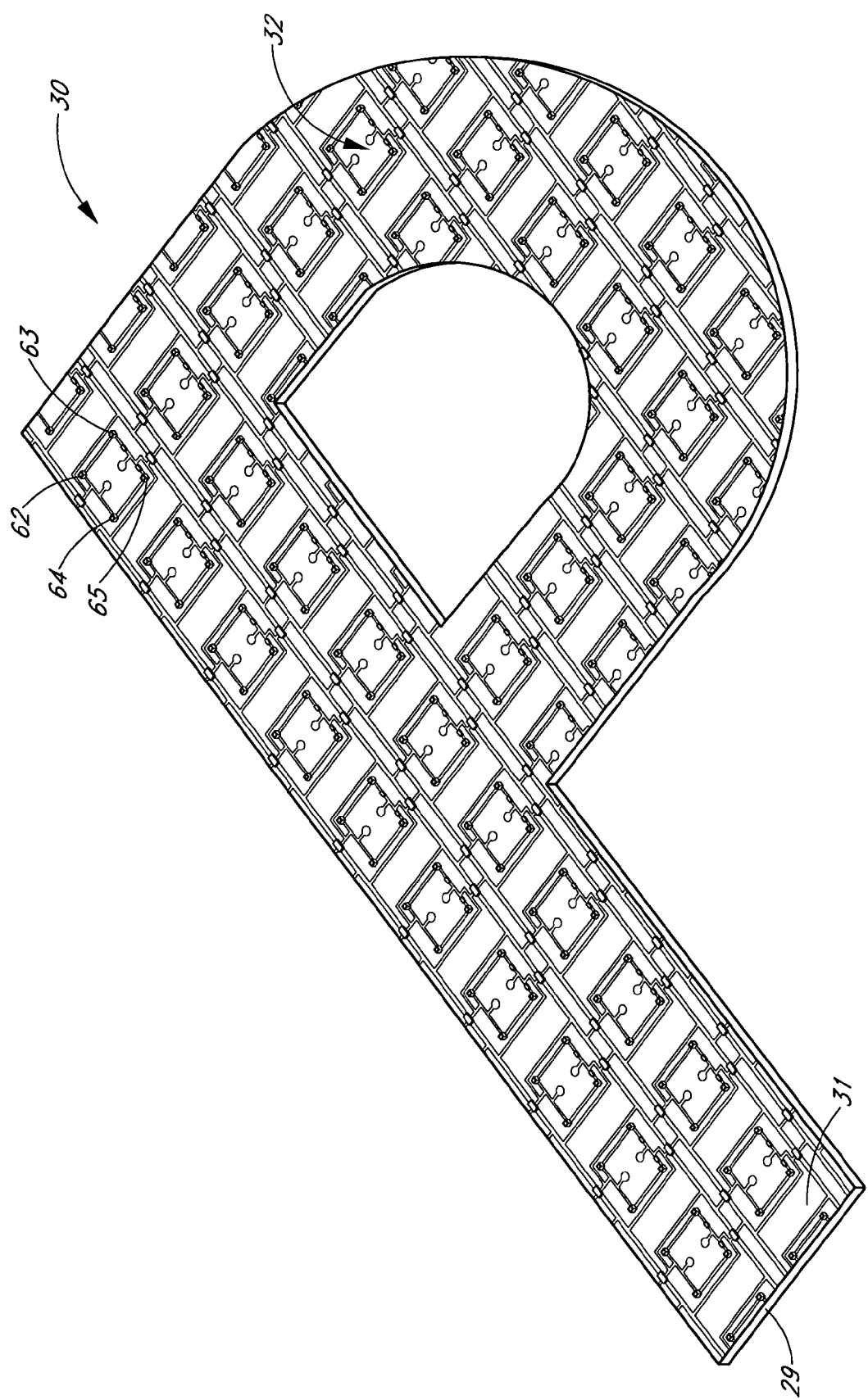
FIG. 4B is a perspective view of the panel of FIG. 4A after having been cut to a desired shape.

In the illustrated embodiment, a plurality of circuit paths is disposed on the dielectric layer to form one or more circuit units 32. A plurality of interconnected electrical circuit units 32 is disposed on the dielectric layer 31 of the panel 30. Each circuit unit 32 is preferably configured to support and power LEDs 62, 63, 64, 65 integrated in the circuit unit 32 so that the panel 30 may be illuminated. In some embodiments, as shown in FIG. 4B, the panel with the plurality of circuit units 32 may be cut to a desired shape and still enable lighting of the LEDs 62, 63, 64, 65 in a plurality of the circuit units 32.

Figure 5A:
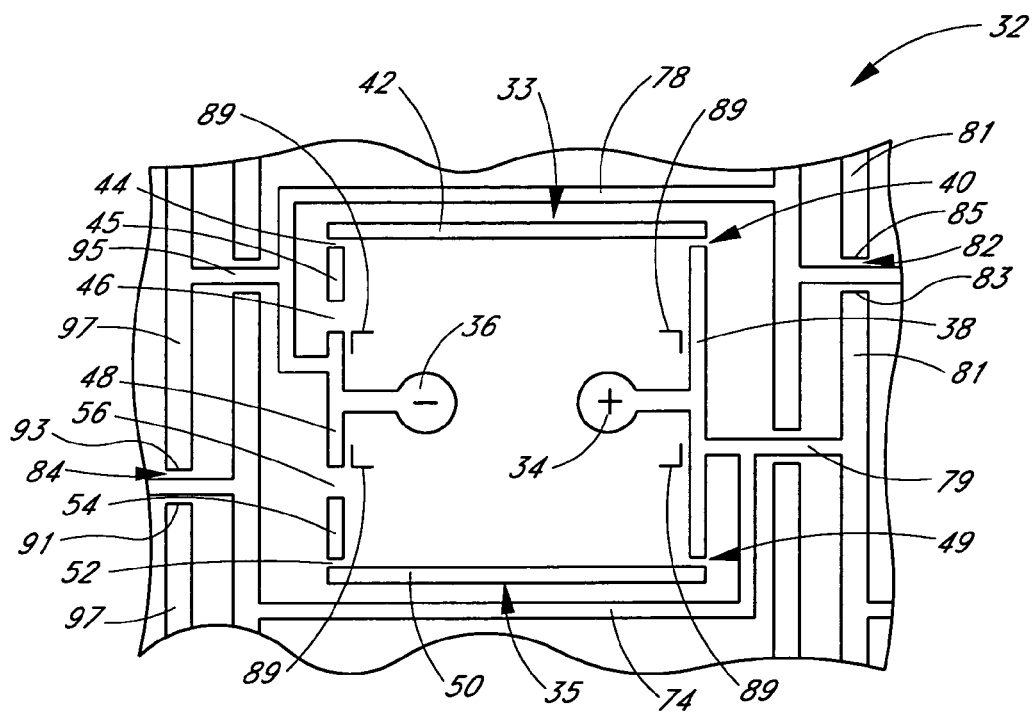
FIG. 5A is a schematic view of an embodiment of a circuit unit.
Figure 5B:
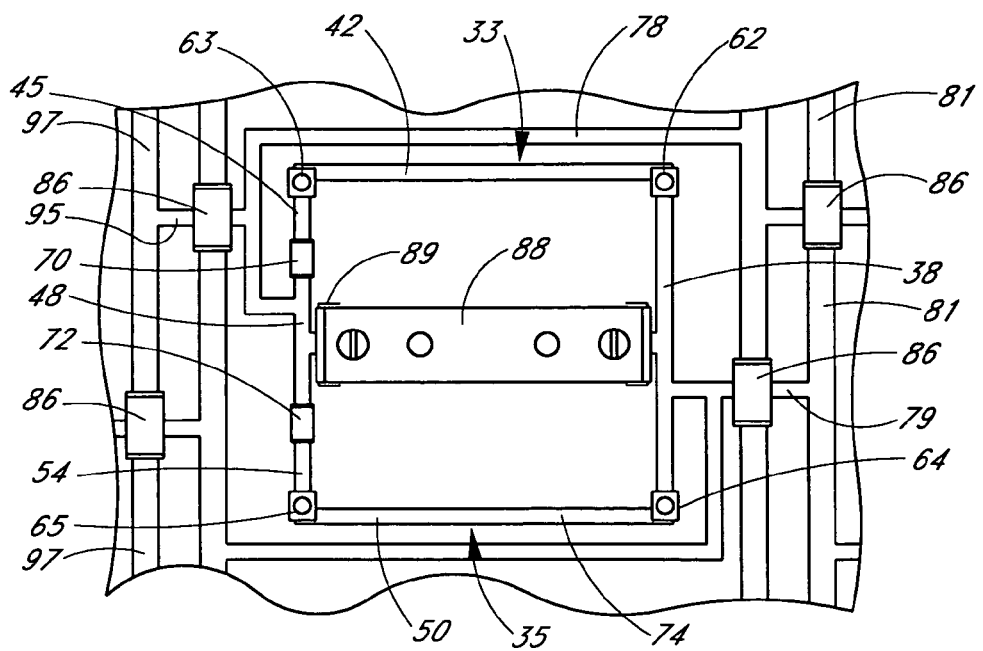
FIG. 5B is a schematic view of the circuit unit of FIG. 5A with electrical components in place.

With reference next to FIGS. 5A and 5B, one embodiment of a circuit unit 32 preferably comprises a positive contact 34 and a negative contact 36. Each circuit unit 32 comprises a plurality of circuit paths 33, 35 electrically communicating between the positive contact 34 and the negative contact 36. In one embodiment, the circuit paths 33, 35 comprise a plurality of traces that link electrical components.

In the illustrated embodiment, the positive contact 34 electrically communicates with the negative contact 36 through a first circuit path 33 and a second circuit path 35 of the circuit unit 32. In the first circuit path 33, a first trace 38 extends from the positive contact 34 to a first break 40. A second trace 42 leads from a location adjacent the first break 40 to a second break 44. A third trace 45 leads from a location adjacent the second break 44 to a third break 46. A fourth trace 48 extends, in one direction, from the negative contact 36 to a location adjacent the third break 46.

In the second circuit path 35, the first trace 38 extends from the positive contact 34 leads to a fourth break 49 as well as to the first break 40, as described above. A fifth trace 50 extends from a location adjacent the fourth break 49 to a fifth break 52. A sixth trace 54 extends from a location adjacent the fifth break 52 to a sixth break 56. The fourth trace 48 extends from the negative contact 36 to the sixth break 56 in one direction and to the third break 46 in another direction.

Figure 6A:
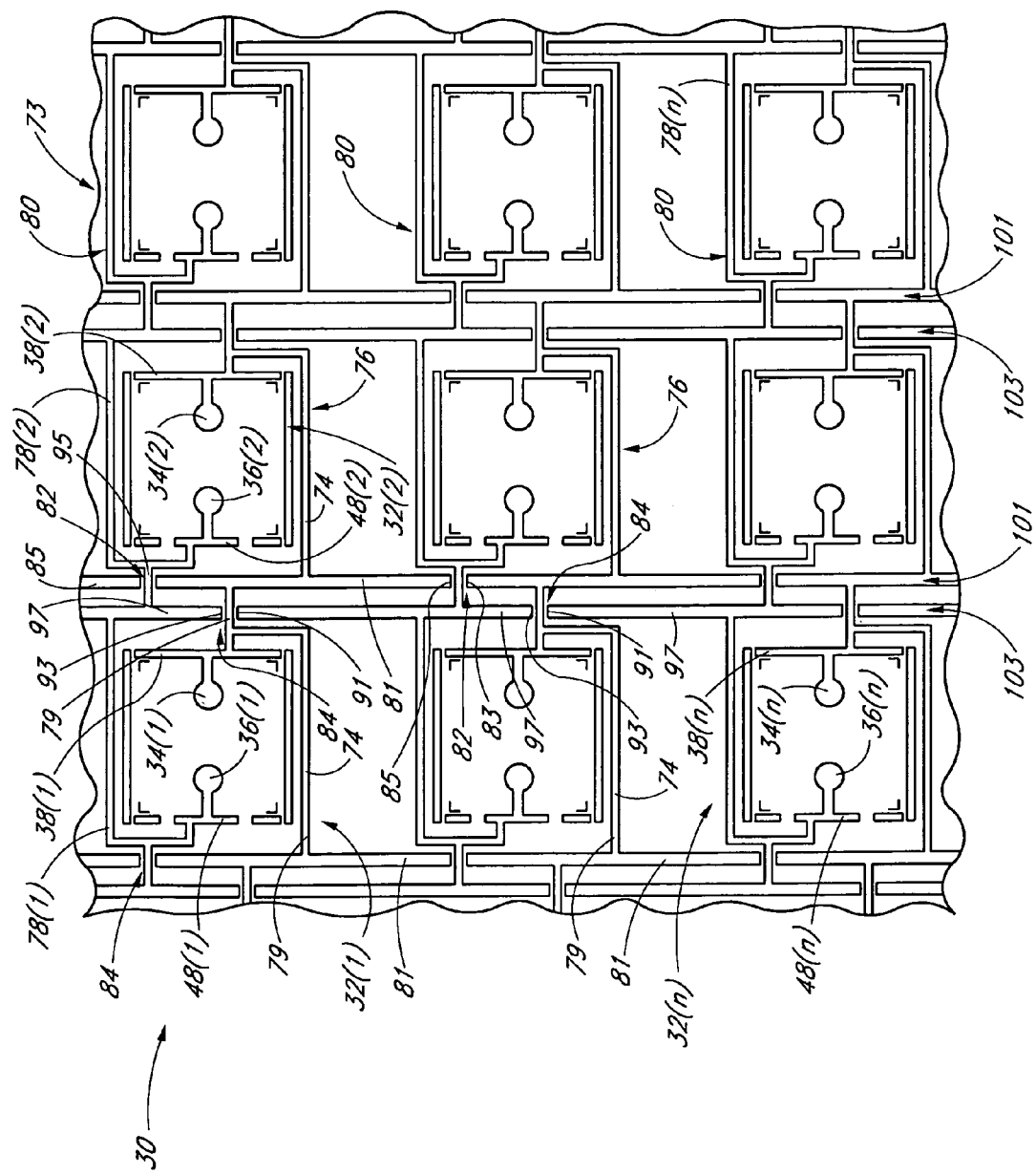
FIG. 6A is a schematic view of a plurality of interconnected circuit units.
Figure 6B:
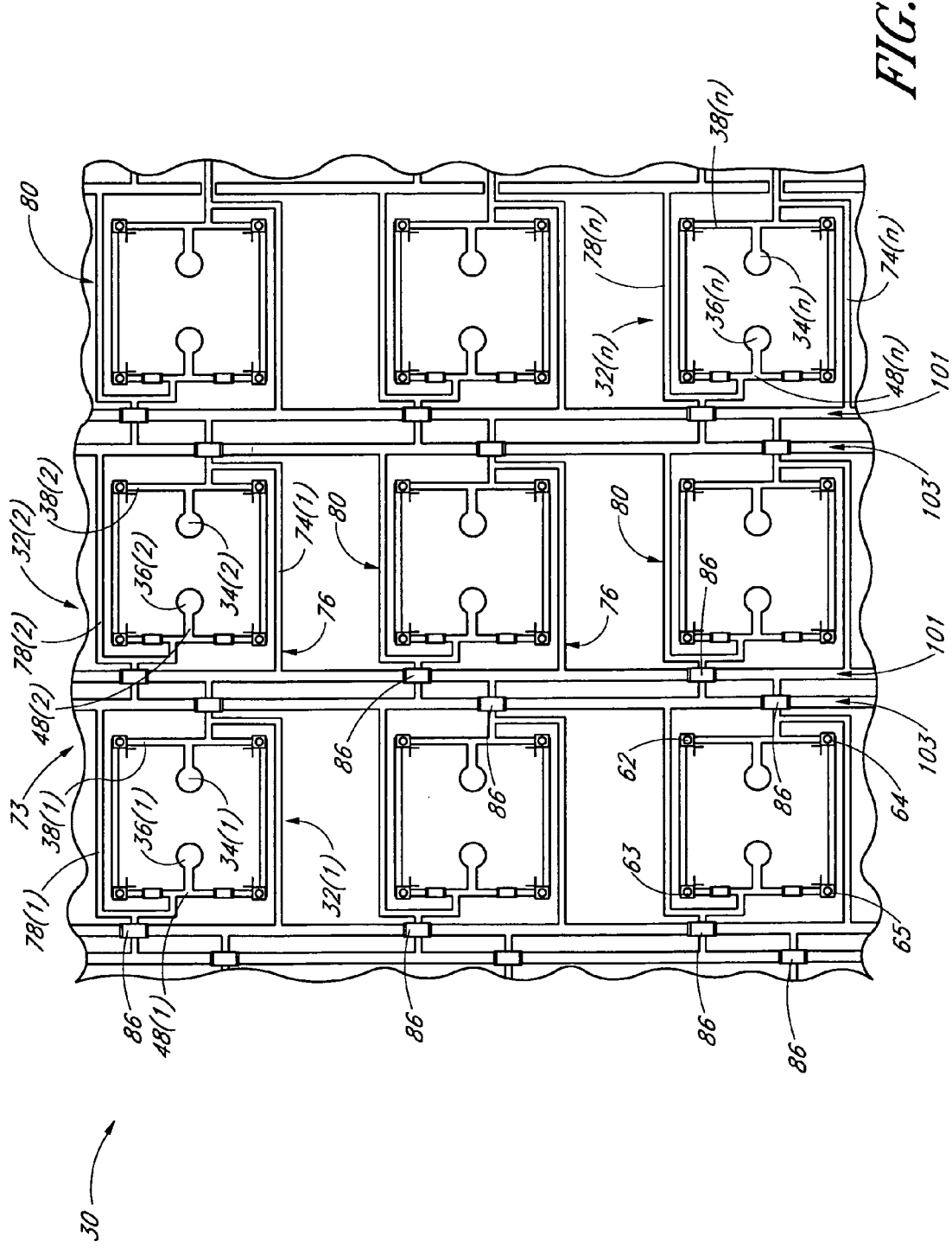
FIG. 6B is a schematic view of an embodiment of a panel containing a plurality of interconnected circuit units with various electrical components attached thereto.
Figure 7:
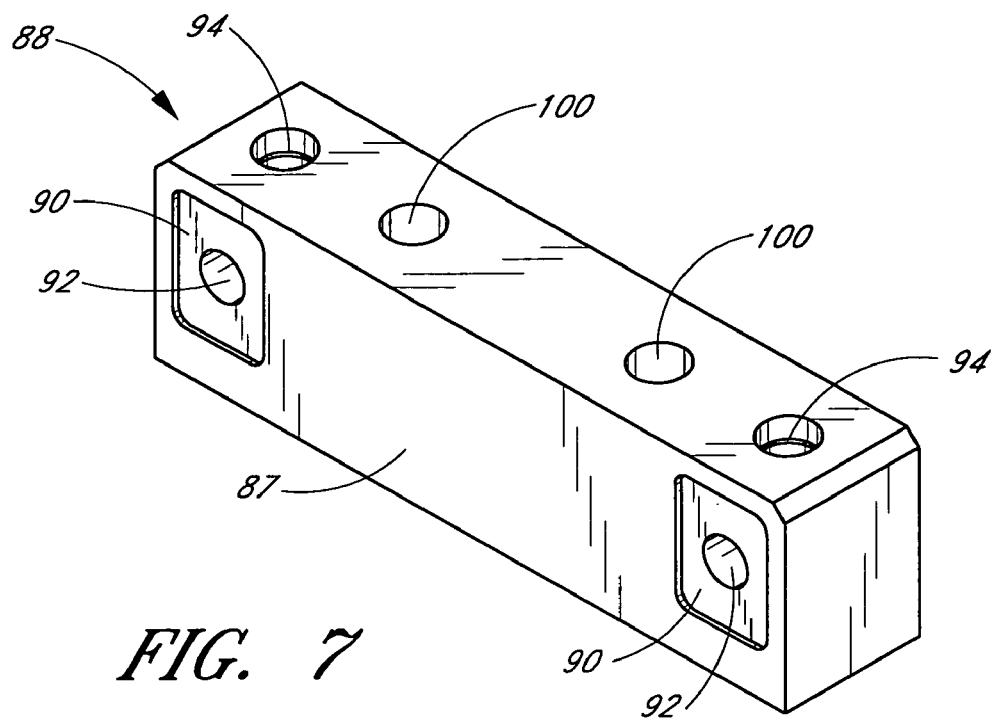
FIG. 7 is a perspective view of an embodiment of a power connector.

With specific reference to the illustrated embodiments of FIGS. 5B and 6B, the breaks in the circuit paths 33, 35 preferably are traversed by various electrical components, such as resistors, LEDs, etc. In one embodiment, as shown in FIGS. 5B and 6B, the first and second breaks 40, 44 are traversed by a first and second LED 62, 63, respectively. Similarly, the fourth and fifth breaks 49, 52 are traversed by a third and fourth LED 64, 65, respectively. The third and sixth breaks 46, 56 are traversed by a first and second resistor 70, 72, respectively. Thus, the first circuit path 33 connects the positive contact 34 and the negative contact 36 through the first trace 38, the first LED 62, the second trace 42, the second LED 63, the third trace 45, the first resistor 70, and the fourth trace 48. The second circuit path 35 connects the positive contact 34 and the negative contact 36 through the first trace 38, the third LED 64, the fifth trace 50, the fourth LED 65, the sixth trace 54, and the fourth trace 48. In this configuration, the two circuit paths 33, 35 provide a parallel electrical connection between the positive and negative contacts 34, 36, each circuit path containing two LEDs and a resistor in series. Also as illustrated, the LEDs and resistors are arranged between the positive and negative contacts so that power is supplied to illuminate the LEDs.

With reference next to FIGS. 6A and 6B, the illuminated panel 30 preferably includes several circuit units 32 that are connected by electrically conductive traces, creating a circuitry pattern 73. FIGS. 6A and 6B are schematic diagrams illustrating portions of embodiments of an illuminated panel 30 with n identical circuit units 32(1)-32(n) (collectively "the circuit units 32"). The circuit units 32 include n positive contacts 34(1)-34(n) (collectively "the positive contacts 34") and n negative contacts 36(1)-36(n) (collectively "the negative contacts 36"). Also associated with the circuit units 32 are preferably n first traces 38(1)-38(n) (collectively "the first traces 38") and n fourth traces 48(1)-48(n) (collectively "the fourth traces 48"). In the illustrated embodiment, the circuit units are arranged into rows and columns.

In the illustrated embodiment, a first connecting trace 74 leads from a portion of the first trace 38(1) of a circuit unit 32(1) to a portion of a first trace 38(2) of a second circuit unit 32(2). Accordingly, the positive contact 34(1) of one circuit unit 32(1) is electrically connected to the positive contact 34(2) of another circuit unit 32(2). The circuitry pattern 73 preferably includes n first connecting traces 74(1)-74(n) (collectively "the first connecting traces 74"). Several first connecting traces 74 in combination electrically connect several positive contacts 34, forming a common positive source lead 76. The circuitry pattern 73 preferably includes a plurality of common positive source leads 76. In the illustrated embodiment, each row of circuit units 32 has a common positive source lead 76. In the embodiment illustrated in FIG. 6B, the plurality of common positive source leads 76 are interconnected by a plurality of jumpers 86, as will be described below. As such, the rows of circuit units 32 are all redundantly, electrically, and positively interconnected.

With continued reference to FIGS. 6A and 6B, the circuitry pattern 73 also preferably includes a second connecting trace 78 that leads from a portion of the fourth trace 48(1) of a first circuit unit 32(1) to a portion of a fourth trace 48(2) of a second circuit unit 32(2). Accordingly, the negative contact 36(1) of one circuit unit 32(1) is electrically connected to the negative contact 36(2) of another circuit unit 32(2). The circuitry pattern 73 also preferably includes n second connecting traces 78(1)-78(n) (collectively "the second connecting traces 78"). Several second connecting traces 78 in combination electrically connect several negative contacts 36, forming a common negative source lead 80. The circuitry pattern 73 preferably includes a plurality of common negative source leads 80. In the illustrated embodiment, each row of circuit units 32 has a common negative source lead 80. In the embodiment illustrated in FIG. 6B, the plurality of common negative source leads 80 are also preferably interconnected by a plurality of jumpers 86. As such, the rows of circuit units 32 are all redundantly, electrically, and negatively connected.

With reference again to FIGS. 5A and 6A, each first connecting trace 74 comprises a first portion 79 and a second portion 81. In the illustrated embodiment, the first portion 79 electrically connects the positive contacts 34 of adjacent circuit units 32 within a row and extends generally in a direction along the row. The second portion 81 extends generally in a direction transverse to the row and comprises opposing first and second ends 83, 85. As in the illustrated embodiment, there may be some overlap in the first and second portions 79, 81. Preferably, rows of circuit units 32 are arranged so that the first and second ends 83, 85 of first connecting trace 74 second portions 81 of the common positive source leads 76 of adjacent rows are disposed adjacent one another. Preferably, the first and second ends 83, 85 are arranged so that a first connecting trace break 82 electrically separates the common positive source leads 76 of adjacent rows from one another.

Similarly, each second connecting trace 78 comprises a first portion 95 and a second portion 97. In the illustrated embodiment, the first portion 95 electrically connects the negative contacts 36 of adjacent circuit units 32 within a row and extends generally in a direction along the row. The second portion 97 extends generally in a direction transverse to the row and comprises opposing first and second ends 91, 93. As in the illustrated embodiment, there may be some overlap in the first and second portions 95, 97. Preferably, rows of circuit units 32 are arranged so that the first and second ends 91, 93 of second connecting trace 78 second portions 97 of the common negative source leads 80 of adjacent rows are disposed adjacent one another. Preferably, the first and second ends 91, 93 are arranged so that a second connecting trace break 84 electrically separates the common negative source leads 80 of adjacent rows from one another.

With continued reference to FIGS. 5A and 6A, the first portion 79 of the first connecting trace 74 passes through the second connecting trace break 84 without electrically connecting with the second connecting trace 78. Similarly, the first portion 95 of the second connecting trace 78 passes through the first connecting trace break 82 without electrically connecting with the first connecting trace 74. As such, the breaks 84 enable electrical interconnection of the positive contacts 34 of circuit units within a row via the common positive source lead 76; and the breaks 82 enable electrical interconnection of the negative contacts 36 of circuit units within a row via the common negative source lead 80.

The first connecting trace breaks 82 and the second connecting trace breaks 84 preferably are each traversed by a jumper 86. As shown in FIG. 6B, jumpers 86 conduct electrical current between the first and second ends 83, 85 of adjacent first connecting traces 74 and between first and second ends 91, 93 of the second connecting traces 78. However, the jumpers 86 avoid electrically connecting the first and second connecting traces 74, 78 to each other. As such, the jumpers 86 electrically interconnect the common positive and negative source leads 76, 80 of adjacent rows.

It will be appreciated that the term "jumper" is a broad term and is used herein in its ordinary sense and includes, without limitation, an electrical component that is configured to electrically span a space between two spaced-apart electrical traces or the like so as to electrically interconnect the two traces. In the illustrated embodiment, the jumpers 86 interconnect two electrical traces while traversing another trace. Most preferably, a jumper connects traces, but with very little or no resistance.

In the circuit pattern 73, the second portions 81, 97 preferably collectively define a plurality of raceways 101, 103 that extend generally transverse to the common positive and negative source leads 76, 80. The raceways 101, 103 are configured to interconnect several common positive and negative source leads 76, 80 and to create redundant leads to the circuit units 32. For example, a circuit unit 32(2) may receive power from another circuit unit 32(1) that is connected to the same common positive and negative lead 76, 80, or the circuit unit 32(2) may receive power from circuit units 32 located on other common positive and negative leads 76, 80 through the plurality of raceways 101, 103. Accordingly, should there be a break in the electrical path or lead along a common positive or negative source lead 76, 80 or a break in one or more of the raceways 101, 103, the redundant connections or leads still supply power to all or most of the circuit units 32. It will be appreciated that the term "raceway" is a broad term and is used herein in its ordinary sense and includes, without limitation, an electrical trace that is configured to interconnect, either by itself or in conjunction with electrical components and other traces, a plurality of common positive or negative source leads 76, 80.

With continued reference to FIGS. 5A-6B, the circuitry pattern 73 permits multiple positive traces 76 to be electrically connected to each other, and likewise multiple negative traces 78 are electrically connected to each other. The circuitry pattern 73 preferably places the circuit units 32 electrically in parallel with one another while also providing redundant electrical supply traces to power each circuit unit 32. Because of the configuration of this embodiment, the circuitry pattern 73 permits illumination of the LEDs of the circuit units 32 by providing power to any one circuit unit 32 within the electrically connected circuitry pattern 73. As previously mentioned, the electrical connection between circuit units 32 is redundant, and circuit units 32 will remain electrically connected even if one or more connective traces are removed, interrupted, or one or more of the electrical components, such as a jumper, fails.

In a preferred embodiment, the circuitry pattern 73 is printed on the dielectric surface and comprises an electrically conductive material such as silver ink. In one preferred embodiment, conventional printing technologies, such as offset printing or inkjet printing, are used to apply silver ink or another printable conductive material. It is to be understood that other methods, including electrochemical etching, may be used to form the conductive traces of the circuitry 73.

With reference to FIG. 6B, the electrical components such as LEDs, resistors, and jumpers are shown disposed on the printed circuitry pattern 73. As shown, such electrical components are electrically connected to the conductive traces so that current flows therethrough. Thus, due to the electrical interconnections and redundant electrical paths, an entire or partial panel comprising such circuit units 32 may be powered and illuminated by applying power to one circuit unit 32. In one embodiment, the electrical components are attached using a conductive silver epoxy. Of course, other methods and materials, such as soldering, may be used to connect the electrical components in place.

With reference next to FIGS. 7-10, a power connector 88 is shown for supplying power across the positive and negative contacts 34, 36 of a circuit unit 32. The illustrated power connector 88 comprises an elongate body 87 and preferably comprises a pair of wire holders 90. Each wire holder 90 comprises a first hole 92 to receive a wire or other conductor and a second hole 94 to receive a bolt or screw 96 (shown in FIG. 8). The second hole 94 is preferably configured to permit placement of the bolt or screw 96 therein to engage and tightly hold the wire therein. It is to be understood that other embodiments can employ another arrangement to engage a conductor for supplying power to the connector 88.

Figure 8:
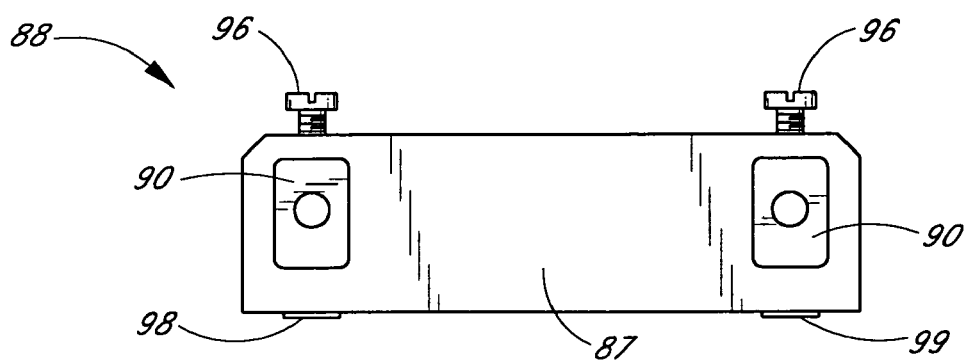
FIG. 8 is a front view of the power connector of FIG. 7.
Figure 9:
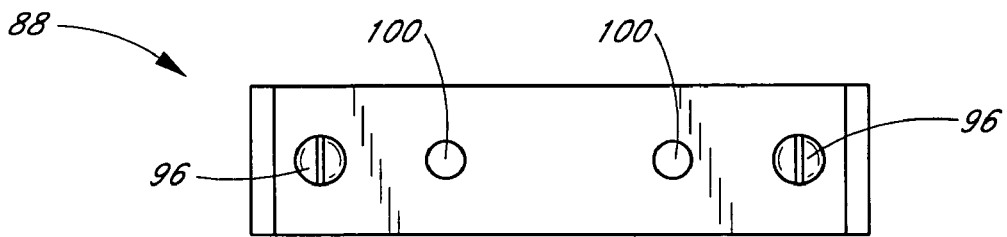
FIG. 9 is a top view of the power connector of FIG. 7.

Each wire holder 90 is electrically connected to a respective power connector contact 98, 99, shown in FIG. 8. More specifically, a wire holder 90 may be configured to electrically connect a positive supply wire to a first power connector contact 98, and the other wire holder 90 may be configured to electrically connect a negative supply wire to a second power connector contact 99. The power connector contacts 98, 99 are electrically insulated from one another.

Figure 10:
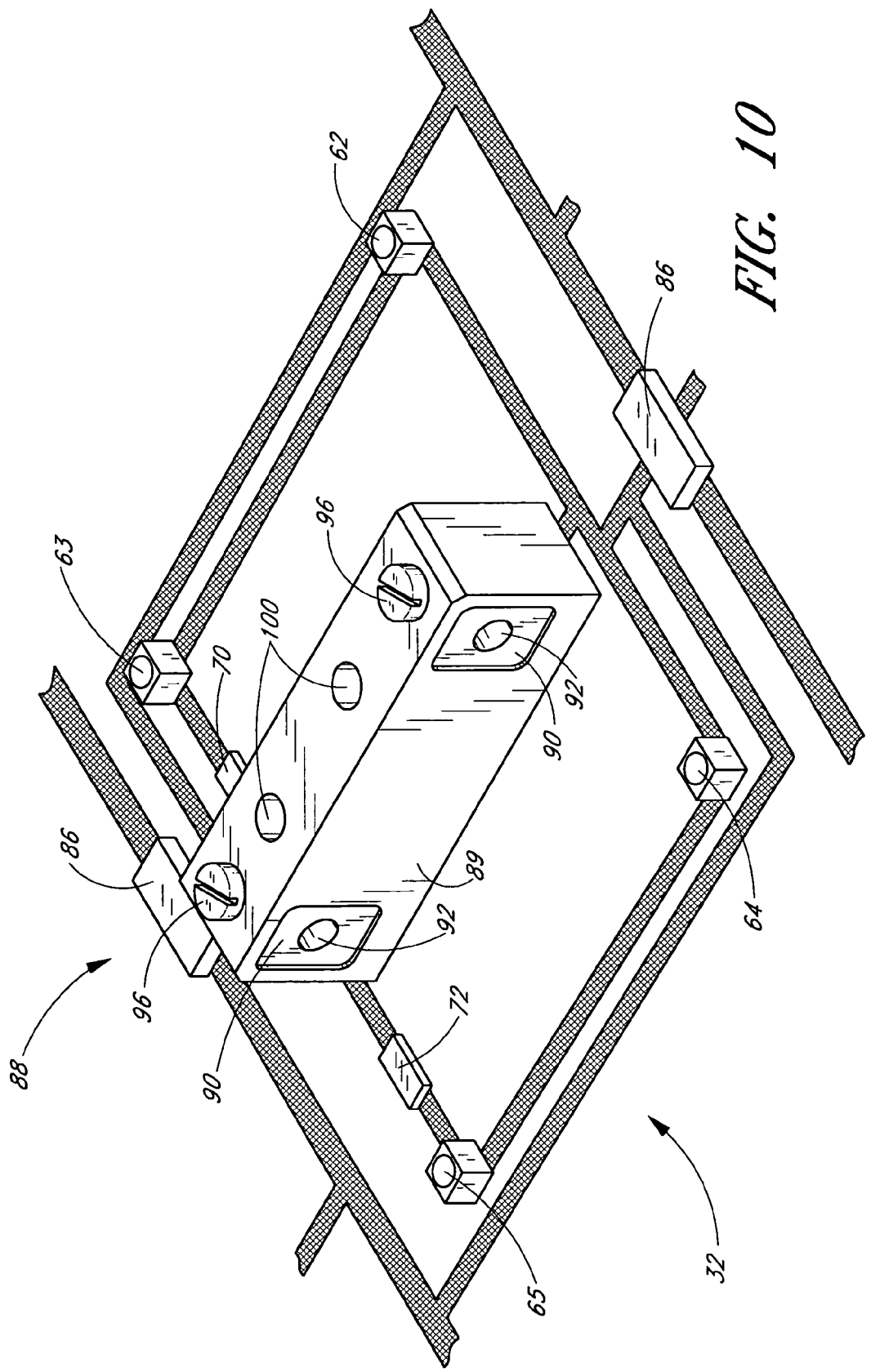
FIG. 10 is a perspective view of the power connector of FIG. 7 attached to a circuit unit of the panel of FIG. 4A.

The power connector contacts 98, 99 preferably are spaced apart a distance that corresponds to the distance between the positive and negative contacts 34, 36. Thus, as shown in FIG. 10, the power connector 88 may be arranged to fit onto the panel 30 so that the first and second power connector contacts 98, 99 engage corresponding positive and negative contacts 34, 36 of a circuit unit 32. As such, power is supplied by the power connector 88 to the circuit unit 32.

The power connector 88 further preferably comprises a pair of connector screw holes 100 formed therethrough for securing the power connector 88 to the panel 30. The power connector 88 preferably is secured with a screw or bolt. Alternatively or in addition, the power connector 88 can be secured by a length of adhesive, most preferably double-stick tape, which is disposed on a bottom surface of the power connector 88. As such, the power connector contacts 98, 99 and the positive and negative contacts 34, 36 are engaged, and the power connector 88 can be secured in place.

The panel 30 preferably provides at least a visual indicator 89 (shown in FIG. 5A) corresponding to the connector 88 to ensure that the connector 88 is applied correctly. In one embodiment, the visual indicator 89 may comprise a marking on the panel 30 that is shaped in a right angle. Preferably, the right angle marking corresponds to a corner or edge of the connector 88. Accordingly, when the connector 88 is placed on the panel 30 to connect the positive and negative contacts 34, 36, the visual indicator 89 may align the edges of the connector 88 to confirm that the connector 88 is properly positioned. Additionally, the positive and negative contacts 34, 36 are preferably marked with a "+" for the positive contact 34 and a "−" for the negative contact 36.

The power connector 88 preferably is quickly and easily secured in place by applying the adhesive to the panel 30 so that the adhesive holds the power connector 88 in place with the positive and negative contacts correctly aligned. In order to facilitate a more permanent connection, self tapping screws preferably are advanced through the connector screw holes 100 and into the panel 30. As such, the power connector 88 is securely attached to the panel 30 in a manner so that power is appropriately applied to the circuit unit 32.

In one embodiment, an illuminated panel is provided comprising a circuit unit pattern disposed on substantially the entire panel. Preferably, the panel is provided in a standard rectangular sheet, such as a 4'×8' sheet, as shown in FIG. 4A. In other embodiments, the panel may be provided pre-shaped in a variety of standard shapes, and the circuit units 32 may be arranged so that one power connector 88 provides power to all or most of the circuit units 32.

Figure 11:
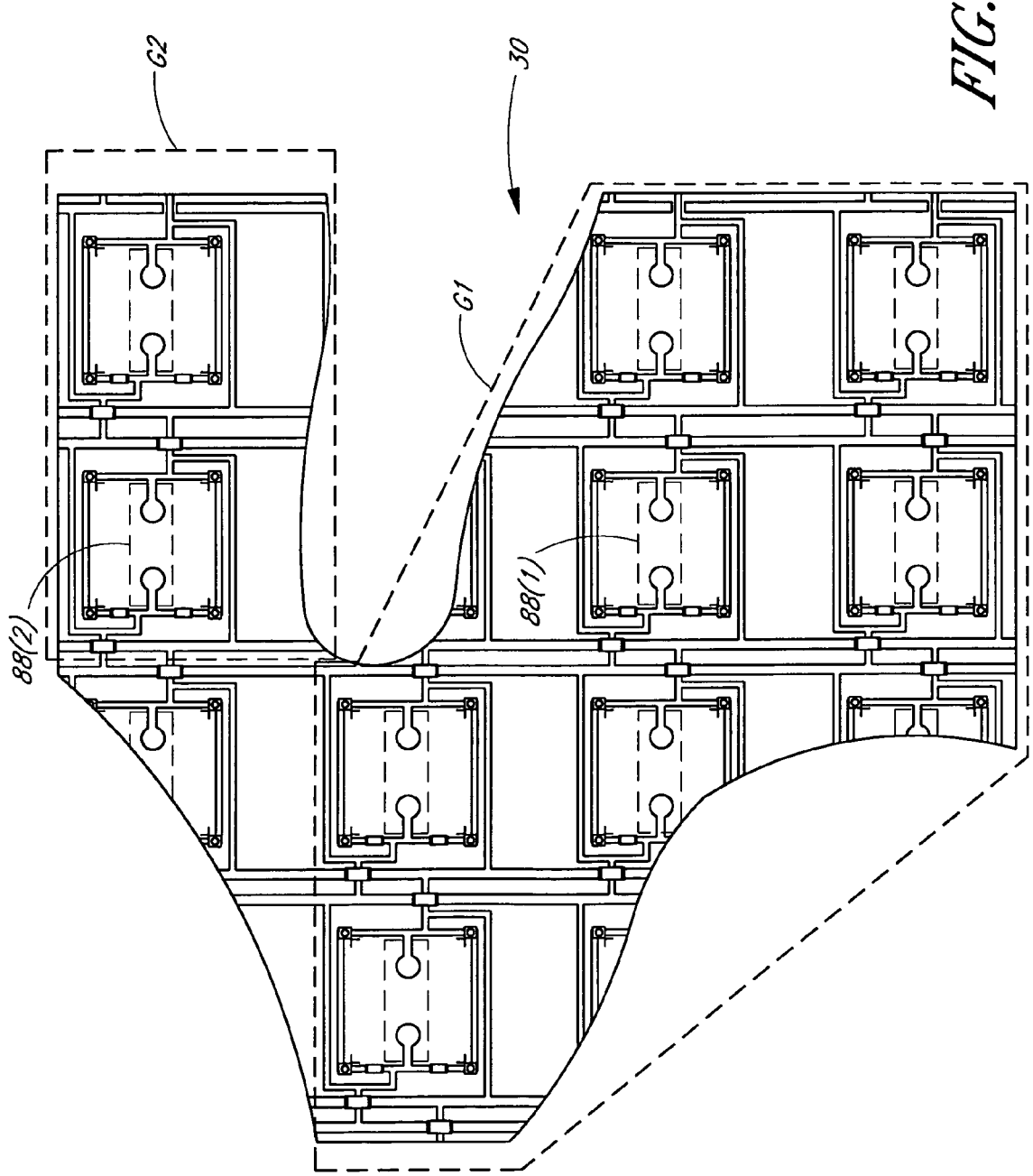
FIG. 11 is a schematic view of a portion of an embodiment of a panel that has been cut to a desired shape and that contains a plurality of circuit units that are powered by two power connectors.

In another embodiment, it is anticipated that an illuminated panel is cut or shaped to a custom or desired shape, as in FIGS. 4A-B. With reference next to FIG. 11, such cutting may disrupt circuit units 32 and the electrical connecting traces therebetween so that the circuit units 32 on the panel 30 are not necessarily all electrically connected to one another. However, due to the redundant electrical connections between the circuit units 32, groups of circuit units 32 are still electrically connected. FIG. 11 shows a portion of an embodiment of a panel that has been cut to a desired shape. In the illustrated embodiment, a first group of circuit units G1 is electrically connected to one another, but a second group G2 of circuit units G2 is electrically isolated from the first group G1. However, circuit units in the second group G2 are electrically connected to one another.

In the embodiment illustrated in FIG. 11, the panel 30 is illuminated by applying a first power connector 88(1) to one of the circuit units 32 of the first group G1 and applying a second power connector 88(2) to one of the circuit units 32 of the second group G2. With this configuration, power is provided to most of the LEDs on the cut panel 30. Although some circuit units 32 on the cut panel 30 may not be connected to a power supply or may contain LEDs that are not illuminated because of circuit interruptions, the circuit units 32 containing illuminated LEDs provide sufficient illumination for the intended lighting application.

After shaping the panel 30, identification of groups that require separate power connectors 88 may be made by connecting power connectors 88 to the panel 30. Preferably, a power connector 88 is connected to the panel 30, and the panel 30 is illuminated. If some circuit units 32 are electrically disconnected from the illuminated circuit units 32, the disconnected circuit units 32 will not be illuminated. Another power connector 88 is thus applied to one or more of the dark, or disconnected, circuit units 32. Application of another power connector 88 will likely illuminate one or more circuit units 32, but it may not illuminate all desired circuit units 32. If there remain disconnected circuit units 32 that are not illuminated, power connectors may be applied to them until an adequate or desired number of circuit units 32 are illuminated. In some embodiments, the panel may be configured such that each power connector 88 supplies electrical power to at least two circuit units. Preferably, the panel includes an overall ratio of at least two illuminatable circuit units per power connector.

It is to be understood that the principles discussed herein may be applied to panels comprising other materials and configured for other applications. For example, the panel can comprise one or more of several types of materials, can be relatively rigid, relatively flexible, or can comprise portions of varied rigidity, while still employing the principles discussed herein. Further, the panel may function as a dielectric with or without the need for any coating or applied layer.

In another embodiment, the panel comprises a laminate material comprising rigid outer lamina separated by a lightweight inner layer, such as honeycomb material. Such an inner layer may be constructed of any desired material, such as polyethylene, Kevlar, or the like. The outer layer may comprise a metal, ceramic, hard plastic, foam, or the like.

In one embodiment, as previously discussed, the panel comprises a layer of polyethylene, or some other polymer, that is sandwiched by two layers of aluminum. During the manufacturing process of the illuminated panel, the panel is cut to a desired shape by a router or other cutting means. During the cutting, the polyethylene provides a proper lubricant for the cutting tools so that cutting tools need no additional lubrication during cutting. This may reduce or eliminate the lubricating oil typically used during the metal sheet cutting process, which may save the manufacturer the cost of the oil and the time required to clean the panel following cutting. However, in some embodiments, it may be advantageous to use oil as a lubricant during the manufacturing process.

Although the embodiments discussed above disclosed the circuit units 32 as having four LEDs and two resistors, it is contemplated that other arrangements of the circuit units 32 could be used. For example, the circuit units 32 could have a single LED per path, coupled with one resistor. Alternatively, the circuit units 32 could have several LEDs per path with no resistors, or no resistors may be necessary. Further, materials with differing resistivity may be used for at least some of the traces in the circuit units 32, obviating the need for the resistors. In yet other embodiments, different color LEDs may be used in the same or different circuit units 32. Additionally, LEDs of different sizes may also be used.

Further, in other embodiments, additional circuitry and components, such as light sensors, may be included on an embodiment of a lighted panel. In one embodiment, at least one circuit unit on the panel is redundantly powered like other circuit units on the panel, but comprises a light sensor rather than LEDs. The sensor circuit unit is thus configured differently than the LED circuit units.

In some embodiments, a first set of circuit units 32 may contain LEDs of a first color, and a second set of circuit units 32 may contain LEDs of a second color. In some embodiments, the first set of circuit units 32 is not electrically connected to the second set of circuit units 32. In this arrangement, providing power to the first set of circuit units 32 will provide illumination in the first color, and providing power to the second set of circuit units 32 will provide illumination in the second color. Thus, a color-changing illumination apparatus may be provided.

As illustrated, the circuitry pattern 73 may be configured to permit placement of the electrical components in the same orientation. For example, in some embodiments, the jumpers, resistors, and even LEDs have an elongate shape that includes a longitudinal axis between positive and negative contacts. The circuitry pattern 73 may be configured to permit parallel and/or coaxial orientation of the electrical components. The parallel orientation of the electrical components may facilitate the assembly process, which may involve a device that is configured to pick up the components from a supply area and place the components in a specified location and orientation on the panel. In some embodiments, the orientations of the electrical components may be different than that shown in the figures.

In the illustrated embodiment of FIG. 6B, the LEDs are shown to be spaced generally equidistant from other LEDs in the circuit unit 32 and from LEDs in other circuit units 32. This may facilitate manufacturing and assembly of the illuminated panel 30. This may also provide uniformity of light output when the LEDs are illuminated. In another embodiment, the LEDs may vary in relative location with other LEDs. In the illustrated embodiment, the circuit units and LEDs are arranged so that adjacent LEDs are positioned about one inch apart, while in other embodiments, the LEDs may be placed uniformly or non-uniformly between about one-half inch to about 5 inches apart. In yet other embodiments, the LEDs may be placed uniformly or non-uniformly significantly less than about one-half an inch or significantly more than about 5 inches.

In some embodiments, once the circuit traces are laid, the electrical components are attached using a conductive epoxy. The illuminated panel may then be heated to an elevated temperature to cure the epoxy. In a preferred embodiment, the illuminated panel employs an epoxy that may be cured at about 150° F. (e.g., silver epoxy). In other embodiments, the illuminated panel may be cured at temperatures ranging from about 120° F. to about 200° F. In yet other embodiments, the illuminated panel may be cured at temperatures less than about 120° F. or greater than about 200° F. For example, in one embodiment, the illuminated panel may be cured at room temperature (about 25 C). Conductive epoxy having a relatively low curing temperature is especially useful in embodiments wherein the panel comprises a material, such as certain foams, that may melt or otherwise degrade at relatively low temperatures. In one embodiment, conductive epoxy having a relatively low curing temperature is used when the panel comprises a foam that begins to melt or degrade at about 140° F.

The panel 30 may be made from various materials and may assume varying shapes. In one embodiment, the panel 30 may be made from laminates. In other embodiments, the panel 30 may be made from sheets of aluminum, foam, non-laminates, hard plastics, any combination of such materials, or other materials that would be suitable for the purposes of the illuminated panel 30. In some embodiments, the panel 30 may originate in a rectangular form. In other embodiments, the panel 30 may be manufactured in other forms or shapes. For example, the panel 30 may be manufactured in shapes that are substantially circular, square, oval, pentagonal, hexagonal, etc. The panel 30 may also have surface contours. For example, the surface contour of the panel 30 may be cylindrical, parabolic, irregular, etc.

The circuit units 32 may also be configured differently than in the illustrated embodiment. For example, the circuit units 32 could be circular, elliptical, or other shapes that may still accommodate the function of the circuit units 32. Additionally, the circuitry pattern 73 may contain circuit units 32 of the same shape and size, as illustrated in the figures, or the circuitry pattern 73 may include circuit units 32 of varying shapes and size. In yet other embodiments, it is contemplated that at least one, or even substantially all, of the circuit units 32 may be irregular in shape or size with respect to other circuit units 32.

The connecting traces 74, 78 may also vary from that shown in the figures. For example, the connecting traces 74, 78 may include more or less redundant connections between circuit units 32. Additionally, the circuit units 32 may be configured with two or more circuit units 32 in series between parallel connections. In some embodiments, the circuit units 32 may be configured such that not every circuit unit 32 contains a positive and negative contact 34, 36, or the contacts 34, 36 are arranged between circuit units 32. Still further embodiments may arrange circuit units in a manner different than the illustrated row/column arrangement.

In another embodiment, a panel as discussed above may be mounted on the underside of a shelf or other surface, and the LEDs may illuminate the space below the shelf. In still another embodiment, the panel comprises a rigid laminate layer that functions as a shelf, and the circuit units and LEDs provide illumination beneath or, in another embodiment, above, the shelf.

In another embodiment, white LEDs are disposed on the panel, and the panel is shaped to comprise an overhead lighting fixture for offices or the like. In still another embodiment, a panel is disposed in a refrigerator to light the refrigerator.

In still another embodiment, a panel comprises a laminate structure wherein a first outer layer comprises circuit units and LEDs, and an opposite, second outer layer comprises a decorative fascia. In one embodiment, such a panel 30 is employed as a halo light. A halo light may be created around the decorative fascia by illuminating the panel 30 and placing the panel 30 adjacent but spaced from a wall so that the light from the panel 30 illuminates the wall. This arrangement will create a halo effect around the decorative fascia when viewed from the non-illuminated side of the panel 30.

In yet another embodiment, the panel comprises a foam sheet. The foam sheet preferably comprises a plurality of circuit units on one side. The foam sheet is cut to a desired shape, and graphics or designs may be applied to the side of the foam sheet opposite the side on which the circuit units are located. The foam sheet may be illuminated by providing power to the circuit units, and the sheet may be positioned adjacent a wall so that the light from the sheet illuminates the wall to create a halo effect around the graphics or design when viewed from the non-illuminated side of the sheet. In some embodiments, the graphics or designs may be applied to the foam sheet before the sheet is cut to the desired shape. Preferably, in embodiments employing a foam panel, electrical components are attached to traces by a material that can be deposited at relatively low temperatures, such as, for example, a silver epoxy configured to be curable at a temperature less than about 150° F.

In accordance with a method for making an illuminated channel letter, a back of the channel letter preferably is provided. The back preferably comprises an illuminated panel. The method further comprises forming the back to a desired shape, providing sides corresponding to the back shape, and providing electrical power to the circuit unit. Other methods and apparatus discussed herein can also be employed, as appropriate, when making a channel letter.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A method of manufacturing an illumination apparatus, the method comprising:

providing a generally rigid substrate with a dielectric surface;

providing a plurality of circuit units on the dielectric surface, each of the circuit units comprising a positive trace, a negative trace, electrically conductive traces between the positive and negative traces, and at least one light emitting diode (LED), a first one and a second one of the circuit units each comprising a positive contact connected to the corresponding circuit unit positive trace, and a negative contact connected to the corresponding circuit unit negative trace, so as to supply power across the LED, the first positive trace being electrically connected to the positive traces of others of the plurality of circuit units, including the positive trace of the second circuit unit;

cutting the generally rigid substrate so that the positive trace of the first circuit unit is disconnected from the positive trace of the second circuit unit, but remains connected to the positive traces of others of the plurality of circuit units;

providing at least one power connector configured to receive power from a power supply, the power connector comprising positive and negative power connector contacts adapted to mate with the positive and negative circuit unit contacts of one of said circuit units; and connecting the power connector to the first circuit unit so that the positive and negative power connector contacts mate with the corresponding positive and negative circuit unit contacts;

wherein power is supplied to the first circuit unit and at least one other circuit unit that is electrically connected to the first circuit unit.

2. The method of claim 1, wherein the circuit units are provided on the dielectric surface by offset printing.

3. The method of claim 2, wherein the circuit units are cured below 150° Fahrenheit.

4. The method of claim 1, wherein the power connector is connected to the circuit unit by at least one bolt or screw.

5. A method of making an illuminated channel letter, the method comprising:

providing a back panel comprising a generally rigid substrate with a dielectric surface and an opposing outer surface, and with a plurality of circuit units formed on the dielectric surface, each circuit unit having a conductive electrical trace formed on the substrate dielectric surface, the trace configured to conduct electrical power to at least one LED that is mounted on the generally rigid substrate, the generally rigid substrate having a unitary structure;

cutting the back panel to a desired alphanumeric shape, the circuit units being distributed in an alphanumerically-shaped array generally resembling the cut alphanumeric shape of the back panel and comprising sufficient numbers of LEDs arranged in the alphanumerically-shaped array so that light emitted from the LEDs of the circuit units generally resembles the desired alphanumeric shape of the back panel;

providing side walls shaped to correspond to the back panel alphanumeric shape as cut;

assembling the side walls and back panel to form a channel in the desired alphanumeric shape, the back panel being spaced from a front edge of the side walls, the dielectric surface defining a back of the channel, the outer surface defining an outer surface of the illuminated channel letter; and providing electrical power to the circuit units.

6. The method of claim 5, wherein the LEDs of a plurality of circuit units are illuminated when electrical power is provided to one of the circuit units.

7. The method of claim 5, wherein a plurality of the circuit units provided on the back panel are electrically interconnected in parallel.

8. The method of claim 7, wherein redundant electrical pathways electrically interconnect the circuit units.

9. The method of claim 8, wherein the step of cutting the back panel comprises disrupting at least one of the redundant electrical pathways that interconnect circuit units, and wherein at least some of the circuit units remain electrically interconnected after the step of cutting.

10. The method of claim 8, wherein the step of cutting the back panel comprises disrupting at least one of the electrical paths of a circuit unit so that electrical power is not conducted to the corresponding LED, and wherein electrical power is conducted to LEDs of other circuit units.

11. The method of claim 5, additionally comprising forming a translucent, light diffusing cover into the desired alphanumeric shape and connecting the cover to the side walls so as to enclose the channel.

12. The method of claim 5, wherein the step of cutting the back panel is performed after the circuit units are formed on the back panel.

13. The method of claim 12, wherein the step of cutting the back panel comprises removing a portion of the back panel having at least one circuit unit formed thereon.

* * * * *